(12) United States Patent
Louis Lee et al.

(10) Patent No.: US 11,887,300 B2
(45) Date of Patent: Jan. 30, 2024

(54) METHOD AND APPARATUS FOR CLASSIFYING A BRAIN ANOMALY BASED ON A 3D MRI IMAGE

(71) Applicant: BEIJING ANDE YIZHI TECHNOLOGY CO., LTD., Beijing (CN)

(72) Inventors: Pershung Louis Lee, Beijing (CN); Wei Sheng Chan, Beijing (CN); Jiahao Ji, Beijing (CN); Zhenzhou Wu, Beijing (CN)

(73) Assignee: BEIJING ANDE YIZHI TECHNOLOGY CO., LTD., Beijing (CN)

( * ) Notice: Subject to any disclaimer, the term of this patent is extended or adjusted under 35 U.S.C. 154(b) by 526 days.

(21) Appl. No.: 17/268,221

(22) PCT Filed: Nov. 15, 2018

(86) PCT No.: PCT/CN2018/115535
§ 371 (c)(1),
(2) Date: Feb. 12, 2021

(87) PCT Pub. No.: WO2020/034469
PCT Pub. Date: Feb. 20, 2020

(65) Prior Publication Data
US 2021/0319555 A1  Oct. 14, 2021

(30) Foreign Application Priority Data
Aug. 13, 2018  (CN) .......................... 201810918731.2

(51) Int. Cl.
*G06T 7/12*  (2017.01)
*G06T 7/00*  (2017.01)
(Continued)

(52) U.S. Cl.
CPC .......... *G06T 7/0012* (2013.01); *G06V 10/764* (2022.01); *G06V 10/7715* (2022.01);
(Continued)

(58) Field of Classification Search
CPC ......... G06T 7/0012; G06T 2207/10088; G06T 2207/20081; G06T 2207/20084;
(Continued)

(56) References Cited

U.S. PATENT DOCUMENTS

2016/0086326 A1 * 3/2016 Raschke .................. G06T 7/11
382/131
2020/0167930 A1 * 5/2020 Wang ...................... G06N 3/08
(Continued)

FOREIGN PATENT DOCUMENTS

| CN | 106250707 A | 12/2016 |
| CN | 107220980 A | 9/2017 |
| CN | 108346145 A | 7/2018 |

OTHER PUBLICATIONS

International Search Report issued in corresponding International Application No. PCT/CN2018/115535; dated May 9, 2019; State Intellectual Property Office of the P.R. China, Beijing, China, 4 pgs.
(Continued)

*Primary Examiner* — Charlotte M Baker
(74) *Attorney, Agent, or Firm* — HAUPTMAN HAM, LLP

(57) ABSTRACT

The present disclosure discloses a method and an apparatus for classifying a brain anomaly and apparatus based on a 3D MRI image, wherein the classifying method comprises: receiving a to-be-processed 3D MRI image, performing a convolution operation on an imaging sequence corresponding to the 3D MRI image based on a first neural network algorithm to obtain segment masks; and performing a classification operation on the imaging sequence corresponding
(Continued)

101: receive a to-be-processed 3D MRI image, and perform a convolution operation on an imaging sequence corresponding to the 3D MRI image based on a first neural network algorithm to obtain feature maps and segmentation mask 102: perform a classification operation on the imaging sequence corresponding to the 3D MRI image based on a second neural network algorithm and the feature maps and segmentation mask to obtain a classification result of the brain anomaly to the 3D MRI image based on a second neural network algorithm and the segment masks to obtain a classification result of the brain anomaly. Supported by the technologies of artificial intelligence and big data processing, embodiments of the present disclosure enable classification of a brain anomaly shown in the received MRI image through training an MRI recognition model, thereby effectively improving classification accuracy of the brain anomaly and further enhancing diagnosis accuracy of the brain anomaly based on the MRI image.

10 Claims, 3 Drawing Sheets

(51) Int. Cl.
    *G06V 10/764*     (2022.01)
    *G06V 10/77*     (2022.01)
    *G06V 10/82*     (2022.01)
(52) U.S. Cl.
    CPC .... *G06V 10/82* (2022.01); *G06T 2207/10088* (2013.01); *G06T 2207/20081* (2013.01); *G06T 2207/20084* (2013.01); *G06T 2207/30016* (2013.01)

(58) Field of Classification Search
    CPC ........ G06T 2207/30016; G06V 10/764; G06V 10/7715; G06V 10/82; G06F 18/213; G06F 18/24
    USPC ......................................................... 382/128
    See application file for complete search history.

(56) References Cited

U.S. PATENT DOCUMENTS

2021/0158523 A1*   5/2021   Khademi ............... G16H 30/40
2022/0386872 A1*  12/2022   Chen .................... A61B 8/0808

OTHER PUBLICATIONS

Written Opinion issued in corresponding International Application No. No. PCT/CN2018/115535; dated May 9, 2019, State Intellectual Property Office of the P.R. China, Beijing, China, 3 pgs.
Search Report issued in corresponding Chinese Application No. CN201810918731.2; dated May 27, 2020; 2 pgs.
First Office Action issued in corresponding Chinese Application No. CN201810918731.2; dated May 27, 2020 ; 23 pgs.
Second Office Action issued in corresponding Chinese Application No. CN201810918731.2; dated Aug. 10, 2020; 12 pgs.

* cited by examiner

METHOD AND APPARATUS FOR CLASSIFYING A BRAIN ANOMALY BASED ON A 3D MRI IMAGE

RELATED APPLICATIONS

The present application is a National Phase of International Application Number PCT/CN2018/115535 filed Nov. 15, 2018 and claims priority to Chinese Application Number 201810918731.2 filed Aug. 13, 2018.

FIELD

Embodiments of the present disclosure generally relate to the technologies in medical image recognition and computer processing, and more particularly relate to a method and apparatus for classifying a brain anomaly based on a 3D MRI image.

BACKGROUND

As a common medical imaging examination type, MRI (Magnetic Resonance Imaging) mainly obtains electromagnetic signals from a human body by leveraging a magnetic resonance phenomenon to reconstruct human body information, such that a physician may identify an anomalous part in a human body based on an MRI image.

The MRI has a wide array of applications, involved in imaging diagnosis of various systems of the whole body, for example, brain and spinal cord, heart and blood vessels, joints and bones, soft tissues, and pelvic cavity, etc.

For patients suffering from cardiovascular diseases, a plurality of image slices may be obtained from the MRI to show heart, the overall heart lesion and its relationship with surrounding structures. This not only facilitates a physician to observe anatomical changes of respective cavities, large vessels, and valves, but also may assist him/her in making a ventricular analysis for qualitative and semi-quantitative diagnosis.

Particularly for patients suffering from brain diseases, the MRI may form coronal plane imaging, sagittal plane imaging, and transverse plane imaging. A physician may determine whether a brain anomaly occurs based on an MRI image.

Currently, when getting an MRI image (e.g., a brain MRI image) of a patient, a physician always identifies or judges an anomaly to a patient's body based on priori medical experiences. In other words, a physician's prior experience plays a dominant role in MRI-based anomaly judgement. This leads to a relatively low accuracy in MRI-based anomaly identification, and easily causes misdiagnosis or delays the patient's treatment.

SUMMARY

In view of the above, embodiments of the present disclosure provide a method and an apparatus for classifying a brain anomaly based on a 3D MRI image, so as to accurately classify a brain anomaly shown in the 3D MRI image and improve the accuracy of brain anomaly identification.

An embodiment of the present disclosure provides a method for classifying a brain anomaly based on a 3D MRI image, comprising:
  receiving a to-be-processed 3D MRI image, performing a convolution operation on an imaging sequence corresponding to the 3D MRI image based on a first neural network algorithm to obtain segment masks; and
  performing a classification operation on the imaging sequence corresponding to the 3D MRI image based on a second neural network algorithm and the segment masks to obtain a classification result of the brain anomaly.

An embodiment of the present disclosure provides an apparatus for classifying a brain anomaly based on a 3D MRI image, comprising: at least one processor and a memory, the memory storing a program, wherein the at least one processor is configured to perform steps of:
  receiving a to-be-processed 3D MRI image, performing a convolution operation on an imaging sequence corresponding to the 3D MRI image based on a first neural network algorithm to obtain segment masks; and
  performing a classification operation on the imaging sequence corresponding to the 3D MRI image based on a second neural network algorithm and the segment masks to obtain a classification result of the brain anomaly.

At least one embodiment of the present disclosure achieves the following technical effects:

According to the embodiments of the present disclosure, segment masks are obtained by receiving a to-be-processed 3D MRI image and performing a convolution operation on an imaging sequence corresponding to the 3D MRI image based on a first neural network algorithm; and a classification result of the brain anomaly is obtained by performing a classification operation on the imaging sequence corresponding to the 3D MRI image based on a second neural network algorithm and the segment masks. Supported by the technologies of artificial intelligence and big data processing, embodiments of the present disclosure enable classification of a brain anomaly shown in the received MRI image through training an MRI recognition model, thereby effectively improving classification accuracy of the brain anomaly and further enhancing diagnosis accuracy of the brain anomaly based on the MRI image.

BRIEF DESCRIPTION OF THE DRAWINGS

To elucidate the technical solutions of the present disclosure, the drawings used in describing the embodiments will be briefly introduced below. It is apparent that the drawings as described only relate to some embodiments of the present disclosure. To those skilled in the art, other drawings may be derived based on these drawings without exercise of inventive work.

DETAILED DESCRIPTION OF EMBODIMENTS

To achieve an objective of the present disclosure, an embodiment of the present disclosure provides a method and an apparatus for classifying a brain anomaly based on a 3D MRI image, wherein the classifying method comprises: receiving a to-be-processed 3D image, performing a convolution operation on an imaging sequence corresponding to the 3D MRI image based on a first neural network algorithm to obtain segment masks; then performing a classification operation on the imaging sequence corresponding to the 3D MRI image based on a second neural network algorithm and the segment masks to obtain a classification result of the brain anomaly. Supported by the technologies of artificial intelligence and big data processing, embodiments of the present disclosure enable classification of a brain anomaly shown in a received MRI image through training an MRI recognition model, thereby effectively improving classification accuracy of the brain anomaly and further enhancing diagnosis accuracy of the brain anomaly based on the MRI image.

Hereinafter, various embodiments of the present disclosure will be described in further detail with reference to the accompanying drawings. Apparently, the embodiments described herein are only part of the embodiments of the present disclosure, not all of them. All other embodiments obtained by those skilled in the art without exercise of inventive work based on the embodiments in the present disclosure will fall within the protection scope of the present disclosure.

Figure 1:
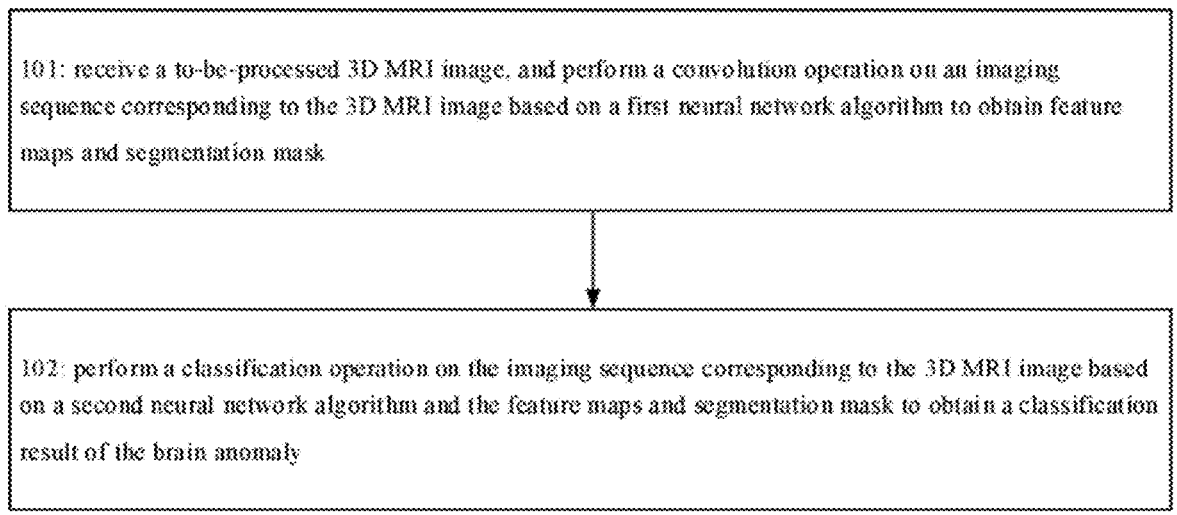
FIG. 1 shows a flow schematic diagram of a method for classifying a brain anomaly based on a 3D MRI image according to an embodiment of the present disclosure.

FIG. 1 shows a flow schematic diagram of a method for classifying a brain anomaly based on a 3D MRI image according to an embodiment of the present disclosure. The method may comprise:

Step 101: receiving a to-be-processed 3D MRI image, performing a convolution operation on an imaging sequence corresponding to the 3D MRI image based on a first neural network algorithm to obtain segment masks.

In this embodiment of the present disclosure, a user (or a physician) inputs an acquired 3D MRI image and initiates a classification operation on the 3D MRI image.

For the input 3D MRI image, a convolution operation is performed on an imaging sequence corresponding to the 3D MRI image based on a first neural network algorithm to obtain segment masks.

The first neural network algorithm here may refer to a Unet (Unity Networking) neural network algorithm, or alternatively other algorithm for image segmentation. The specific type of the first neural network algorithm is not limited here.

Preferably, the convolution operation is performed on the imaging sequence corresponding to the 3D MRI image based on the Unet neural network algorithm to obtain segment masks corresponding to each time of convolution operation, respectively.

In this embodiment of the present disclosure, operations of feature extraction and upsampling processing are performed on the to-be-processed 3D MRI image by leveraging the Unet neural network algorithm, laying a foundation for better classification in the subsequent procedure.

Specifically, a first-layer convolution operation on the imaging sequence corresponding to the 3D MRI image is performed by leveraging the Unet neural network algorithm to obtain segment masks M1 corresponding to the first layer;

a second-layer convolution operation on the segment mask M1 is performed by leveraging the Unet neural network algorithm to obtain a segment mask M2 corresponding to the second layer;

the same way of performing is followed in succession . . . ;

an $m+1^{th}$-layer convolution operation on a segment mask Mm is performed by leveraging the Unet neural network algorithm to obtain a segment mask M (m+1) corresponding to the $m+1^{th}$ layer, wherein m is a natural number greater than 2;

a $n^{th}$-layer convolution operation on the segment mask M(m+1) is performed by leveraging the Unet neural network algorithm to obtain a segment mask Mn corresponding to the $n^{th}$ layer, wherein n is a natural number greater than m+1, and (n−m) is greater than or equal to 2.

Preferably, the following conditions are satisfied between the segment masks and the convolution layer values corresponding to the convolution operation:

for the convolution layer values from 1st to $n/2^{th}$, the numbers of rows or columns in matrices of their segment masks decrease gradually;

for the convolution layer values from $2/n^{th}$ to $n^{th}$, the numbers of rows or columns in matrices of their segment masks increase gradually;

wherein when the convolution layer value is $n/2^{th}$, the number of rows or columns of the matrix of its segment mask is the minimum.

It needs to be noted that the number of layers subjected to the convolution operation may be determined according to actual needs or based on experimental data, which is not specifically limited here.

Figure 2:
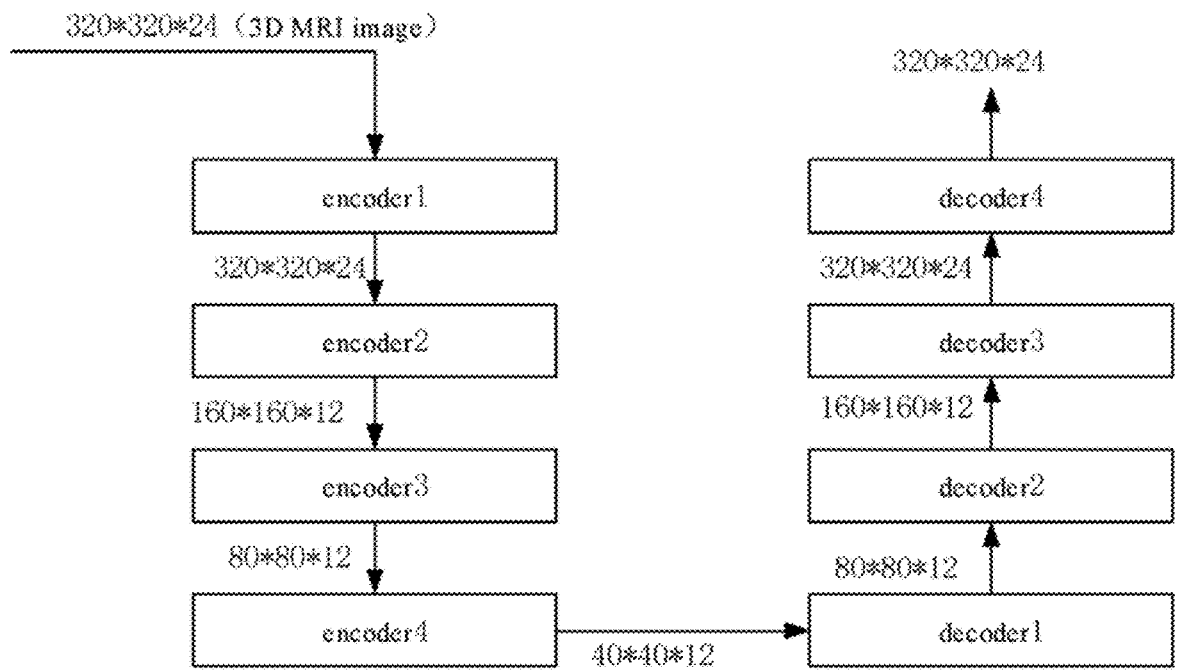
FIG. 2 shows a structural schematic diagram of resulting segment masks according to an embodiment of the present disclosure.

In this embodiment of the present disclosure, the convolution operation may be implemented using an encoder or a decoder; resulting segment masks will be illustrated in detail with an example of executing 8 times of convolution operation (i.e., n=8). FIG. 2 shows a structural schematic diagram of resulting segment masks according to an embodiment of the present disclosure.

Supposing that the to-be-processed 3D MRI image in an embodiment of the present disclosure is 320*320*24, the 320*320*24 3D MRI image is inputted in encoder 1 (the encoder 1 may be referred to as the first layer) to be subjected to the convolution operation, resulting in a segment mask 320*320*24, namely M1=320*320*24;

The resulting 320*320*12 is inputted in encoder 2 (the encoder 2 may be referred to as a second layer) to be subjected to the convolution operation, obtaining a segment mask 160*160*12, namely M2=160*160*24;

The resulting 160*160*12 is inputted in encoder 3 (the encoder 3 may be referred to as a third layer) to be subjected to the convolution operation, obtaining a segment mask 80*80*12, namely M3=80*80*12;

The resulting 80*80*12 is inputted in encoder 4 (the encoder 4 may be referred to as a fourth layer) to be subjected to the convolution operation, obtaining a segment mask 40*40*12, namely M4=40*40*12;

The resulting 40*40*12 is inputted in decoder 1 (the decoder 1 may be referred to as a fifth layer) to be subjected the convolution operation, obtaining a segment mask 80*80*12, namely M5=80*80*12;

The resulting 80*80*12 is inputted in decoder 2 (the decoder 2 may be referred to as a sixth layer) to be subjected to the convolution operation, obtaining a segment mask 160*160*12, namely M6=160*160*12;

The resulting 160*160*12 is inputted in decoder 3 (the decoder 3 may be referred to as a seventh layer) to be subjected to the convolution operation, obtaining a segment mask 320*320*24, namely M7=320*320*24;

The resulting 320*320*24 is inputted in decoder 4 (the decoder 4 may be referred to as an eighth layer) to be subjected to the convolution operation, obtaining a segment mask 320*320*24, namely M8=320*320*240.

In this way, the segment mask corresponding to each layer of convolution operation may be obtained.

Preferably, before performing a classification operation on the imaging sequence corresponding to the 3D MRI image based on a second neural network algorithm and the segment masks, the method further comprises:

ranking the segment masks according to an order of time when the respective segment masks are generated.

Specifically, the segment masks corresponding to the convolution layer values from $n/2^{th}$ to $n^{th}$ are ranked in a descending order of the convolution layer values to obtain a ranking result.

With the content shown in FIG. 2 as an example, the segment masks corresponding to the convolution layer values from $4^{th}$ to $8^{th}$ are ranked in a descending order of the convolution layer values to obtain a ranking result of [8, 320*320*24], [7, 320*320*24], [6, 160*160*12], [5, 80*80*12], and [4, 40*40*12].

Preferably, after obtaining the segment masks, the method further comprises:

outputting a minimized segment loss parameter of the present round of segment mask generating procedure, the minimized segment loss parameter being arranged for adjusting a segment model training parameter, causing a higher accuracy in the next round of segment mask generation.

Specifically, the minimized segment loss parameter $L_{SEG}$ may be expressed as:

$$L_{SEG} = 1 - 2 \frac{\sum_{c,x} \omega_c g_c^{SEG}(x) p_c^{SEG}(x)}{\sum_{c,x} \omega_c [g_c^{SEG}(x) + p_c^{SEG}(x)]}$$

where $L_{SEG}$ denotes a minimized segment loss parameter during the segment mask generation procedure; $\omega_c$ denotes a training scalar of channel c, valued in a range of [0, 1]; $g_c^{SEG}(x)$ is a binary mask model; $p_c^{SEG}(x)$ is a soft prediction mask model.

Step 102: performing a classification operation on the imaging sequence corresponding to the 3D MRI image based on a second neural network algorithm and the segment masks to obtain a classification result of the brain anomaly.

In an embodiment of the present disclosure, a convolution result is obtained by performing the convolution operation on the imaging sequence corresponding to the 3D MRI image based on a second neural network algorithm and the segment masks corresponding to the ranking result; and a brain anomaly is identified and classified based on the convolution result.

Specifically, the convolution operation is performed on the imaging sequence corresponding to the 3D MRI image based on a second neural network algorithm and the segment mask Mn corresponding to the $n^{th}$ layer to obtain a first convolution result; and the convolution operation is performed on the first convolution result based on the second neural network algorithm and the segment mask Mn−1 corresponding to the n−$1^{th}$ layer to obtain a second convolution result;
the convolution operation is performed on the m−$1^{th}$ convolution result based on the second neural network algorithm and the segment mask Mn−m corresponding to the n−m$^{th}$ layer to obtain an m$^{th}$ convolution result, where m is a natural number greater than or equal to n/2.

Figure 3:
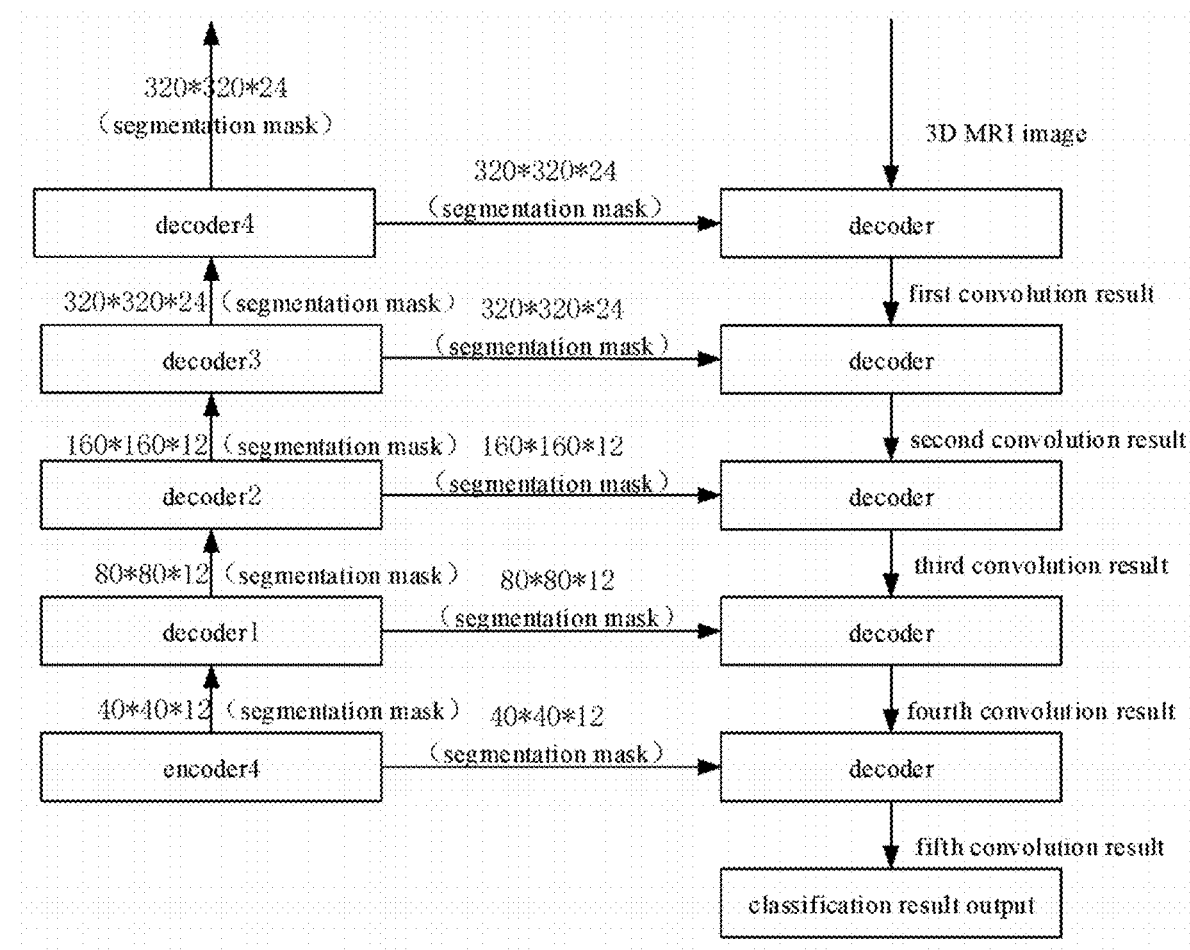
FIG. 3 shows a flow schematic diagram of classifying a brain anomaly according to an embodiment of the present disclosure.

FIG. 3 shows a flow schematic diagram of classifying a brain anomaly according to an embodiment of the present disclosure.

Supposing a 320*320*24 3D MRI image is to be processed in an embodiment of the present disclosure, illustration will be made with the resulting segment masks in FIG. 2.

The to-be-processed 320*320*24 3D MRI image and the segment mask 320*320*24 resulting from processing of the $8^{th}$ layer are inputted to a decoder for the convolution operation, resulting in a first convolution result;

The first convolution result and the segment mask 320*320*24 resulting from processing of the $7^{th}$ layer are inputted to a decoder for the convolution operation, resulting in a second convolution result;

The second convolution result and the segment mask 160*160*12 resulting from processing of the $6^{th}$ layer are inputted to a decoder for the convolution operation, resulting in a third convolution result;

The third convolution result and the segment mask 80*80*12 resulting from processing of the $5^{th}$ layer are inputted to a decoder for the convolution operation, resulting in a fourth convolution result;

The fourth convolution result and the segment mask 40*40*12 resulting from processing of the $4^{th}$ layer are inputted to a decoder for the convolution operation, resulting in a fifth convolution result.

Preferably, the brain anomaly may be identified and classified based on the m$^{th}$ convolution result.

Specifically, in an embodiment of the present disclosure, the brain anomaly may be classified based on the fifth convolution result.

The brain anomaly may also be classified based on the first convolution result, the second convolution result, the third convolution result, the fourth convolution result, and the fifth convolution result.

Preferably, after obtaining the classification result, the method further comprises:

outputting a minimized classification loss parameter of the present round of classification result generating procedure, the minimized classification loss parameter being arranged for adjusting a classification model training parameter, causing a higher accuracy of generating a classification result in the next round.

Specifically, the minimized classification loss parameter $L_{CLS}$ may be expressed as:

$$L_{CLS} = -\sum_i g_i^{CLS} \ln(p_i^{CLS}).$$

where $L_{CLS}$ denotes a minimized classification loss parameter during the classification result generating procedure; $g_i^{CLS}(x)$ denotes a binary mask model; $p_i^{CLS}(x)$ denotes a soft predict mask model; and i denotes the i$^{th}$ convolution operation.

According to the technical solution provided in this embodiment of the present disclosure, segment masks are obtained by receiving a to-be-processed 3D MRI image and performing a convolution operation on an imaging sequence corresponding to the 3D MRI image based on a first neural network algorithm; and a classification result of the brain anomaly is obtained by performing a classification operation on the imaging sequence corresponding to the 3D MRI image based on a second neural network algorithm and the segment masks. Supported by the technologies of artificial intelligence and big data processing, embodiments of the present disclosure enable classification of a brain anomaly shown in the received MRI image through training an MRI recognition model, thereby effectively improving classification accuracy of the brain anomaly and further enhancing diagnosis accuracy of the brain anomaly based on the MRI image.

Figure 4:
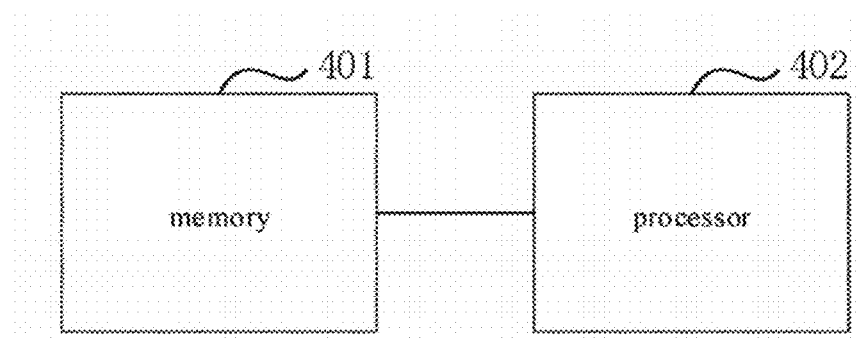
FIG. 4 shows a structural schematic diagram of an apparatus for classifying a brain anomaly based on a 3D MRI image according to an embodiment of the present disclosure.

Based on a same invention idea, FIG. 4 shows a structural schematic diagram of an apparatus for classifying a brain anomaly based on a 3D MRI image according to an embodiment of the present disclosure. The classifying apparatus comprises at least one processor 401 and a memory 402, the memory 402 storing a program, wherein the at least one processor is configured to perform the following steps:

receiving a to-be-processed 3D MRI image, performing a convolution operation on an imaging sequence corresponding to the 3D MRI image based on a first neural network algorithm to obtain segment masks; and performing a classification operation on the imaging sequence corresponding to the 3D MRI image based on a second neural network algorithm and the segment masks to obtain a classification result of the brain anomaly.

In another embodiment of the present application, the processor 401 further performs steps of:

performing a convolution operation on the imaging sequence corresponding to the 3D MRI image based on a Unet neural network algorithm to obtain segment masks corresponding to each time of convolution operation.

In another embodiment of the present application, the processor 401 further performs steps of:

performing a first-layer convolution operation on the imaging sequence corresponding to the 3D MRI image to obtain a segment mask M1 corresponding to the first layer;

performing a second-layer convolution operation on the segment mask M1 to obtain a segment mask M2 corresponding to the second layer;

performing an m+1$^{th}$-layer convolution operation on the segment mask Mm to obtain a segment mask M (m+1) corresponding to the m+1$^{th}$ layer, wherein m is a natural number greater than 2;

performing a n$^{th}$-layer convolution operation on the segment mask M(m+1) to obtain a segment mask Mn corresponding to the n$^{th}$ layer;

wherein n is a natural number greater than m+1.

Particularly, the following conditions are satisfied between the segment masks and the convolution layer values corresponding to the convolution operation:

for the convolution layer values from 1st to n/2$^{th}$, the numbers of rows or columns in matrices of their segment masks decrease gradually;

for the convolution layer values from 2/n$^{th}$ to n$^{th}$, the numbers of rows or columns in matrices of their segment masks increase gradually;

wherein when the convolution layer value is n/2$^{th}$, the number of rows or columns of the matrix of its segment mask is the minimum.

In another embodiment of the present application, the processor 401 further performs a step of:

before performing a classification operation on the imaging sequence corresponding to the 3D MRI image based on a second neural network algorithm and the segment masks, ranking the segment masks according to a sequence of time when the respective segment masks are generated.

In another embodiment of the present application, the processor 401 further performs steps of:

ranking the segment masks corresponding to the convolution layer values ranging from n/2$^{th}$ to n$^{th}$ in a descending order of the convolution layer values to obtain a ranking result.

In another embodiment of the present application, the processor 401 further performs steps of:

performing a convolution operation on the imaging sequence corresponding to the 3D MRI image based on the second neural network algorithm and the segment masks corresponding to the ranking result to obtain a convolution result; and identifying and classifying the brain anomaly based on the convolution result.

In another embodiment of the present application, the processor 401 further performs steps of:

performing a convolution operation on the imaging sequence corresponding to the 3D MRI image based on a second neural network algorithm and the segment mask Mn corresponding to the n$^{th}$ layer to obtain a first convolution result; and performing a convolution operation on the first convolution result based on the second neural network algorithm and the segment mask Mn−1 corresponding to the n−1$^{th}$ layer to obtain a second convolution result;

performing a convolution operation on the m−1$^{th}$ convolution result based on the second neural network algorithm and the segment mask Mn−m corresponding to the n−m$^{th}$ layer to obtain an m$^{th}$ convolution result, where m is a natural number greater than or equal to n/2.

In another embodiment of the present application, the processor 401 further performs steps of:

classifying the brain anomaly based on the m$^{th}$ convolution result to obtain a classification result.

It needs to be noted that the classifying apparatus for a brain anomaly as provided by the embodiments of the present disclosure may be implemented through software or alternatively hardware, which is not specifically limited herein. The processor mentioned in the embodiments of the present disclosure may be a central processor or other controller, which is not specifically limited here.

Figure 5:
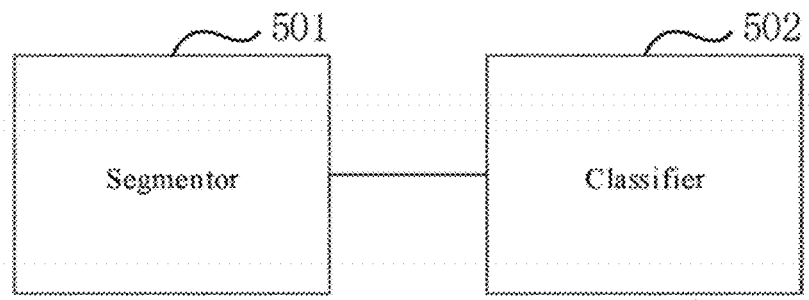
FIG. 5 shows a structural schematic diagram of an apparatus for classifying a brain anomaly based on a 3D MRI image according to an embodiment of the present disclosure.

FIG. 5 shows a structural schematic diagram of an apparatus for classifying a brain anomaly based on a 3D MRI image according to another embodiment of the present disclosure, wherein the classifying apparatus comprises a segmentor 501 and a classifier 502, wherein:

the segmentor 501 is configured to receive a to-be-processed 3D MRI image and perform a convolution operation on an imaging sequence corresponding to the 3D MRI image based on a first neural network algorithm to obtain segment masks;

the classifier 502 is configured to perform a classification operation on the imaging sequence corresponding to the 3D MRI image based on a second neural network algorithm and the segment masks to obtain a classification result of the brain anomaly.

In another embodiment of the present disclosure, the segmentor 501 is specifically configured to perform a convolution operation on the imaging sequence corresponding to the 3D MRI image based on a Unet neural network algorithm to obtain segment masks corresponding to each time of convolution operation.

In another embodiment of the present disclosure, the segmentor 501 specifically performs the convolution operation on the imaging sequence corresponding to the 3D MRI image according to the following manner:

performing a first-layer convolution operation on of the imaging sequence corresponding to the 3D MRI image to obtain a segment mask M1 corresponding to the first layer;

performing a second-layer convolution operation on the segment mask M1 to obtain a segment mask M2 corresponding to the second layer;

performing an $m+1^{th}$-layer convolution operation on the segment mask Mm to obtain a segment mask M (m+1) corresponding to the $m+1^{th}$ layer, wherein m is a natural number greater than 2;

performing a $n^{th}$-layer convolution operation on the segment mask M(m+1) to obtain a segment mask Mn corresponding to the $n^{th}$ layer; wherein n is a natural number greater than m+1.

In another embodiment of the present disclosure, the segment assembly 501 is further configured to rank the segment masks according to an order of time when the respective segment masks are generated and send the segment masks to the classifier according to the ranking result.

In another embodiment of the present application, the following conditions are satisfied between the segment masks and the convolution layer values corresponding to the convolution operation:

for the convolution layer values from 1st to $n/2^{th}$, the numbers of rows or columns in matrices of their segment masks decrease gradually;

for the convolution layer values from $2/n^{th}$ to $n^{th}$, the numbers of rows or columns in matrices of their segment masks increase gradually;

wherein when the convolution layer value is $n/2^{th}$, the number of rows or columns of the matrix of its segment mask is the minimum.

In another embodiment of the present disclosure, the segmentor 501 is specifically configured to rank the segment masks corresponding to the convolution layer values ranging from $n/2^{th}$ to $n^{th}$ in a descending order of the convolution layer values to obtain a ranking result, and send the ranking result to the classifier.

In another embodiment of the present disclosure, the classifier 502 is specifically configured to perform a convolution operation on the imaging sequence corresponding to the 3D MRI image based on the second neural network algorithm and the segment masks corresponding to the ranking result to obtain a convolution result, and identify and classify the brain anomaly based on the convolution result.

In another embodiment of the present disclosure, the classifier 502 specifically performs the convolution operation on the imaging sequence corresponding to the 3D MRI image according to the following manner:

performing a convolution operation on the imaging sequence corresponding to the 3D MRI image based on a second neural network algorithm and the segment mask Mn corresponding to the $n^{th}$ layer to obtain a first convolution result; and performing a convolution operation on the first convolution result based on the second neural network algorithm and the segment mask Mn−1 corresponding to the $n-1^{th}$ layer to obtain a second convolution result;

performing a convolution operation on the $m-1^{th}$ convolution result based on the second neural network algorithm and the segment mask Mn−m corresponding to the n−m$^{th}$ layer to obtain an m$^{th}$ convolution result, where m is a natural number greater than or equal to n/2.

In another embodiment of the present application, the classifier 502 is specifically configured to identify and classify the brain anomaly based on the m$^{th}$ convolution result.

It needs to be noted that the classifying apparatus provided by the embodiments of the present disclosure may be implemented through software or alternatively hardware, which is not specifically limited herein. The classifying apparatus receives a to-be-processed 3D MIRI image and performs a convolution operation on an imaging sequence corresponding to the 3D MRI image based on a first neural network algorithm to obtain segment masks; and then performs a classification operation on the imaging sequence corresponding to the 3D MIRI image based on a second neural network algorithm and the segment masks to obtain a classification result of the brain anomaly. Supported by the technologies of artificial intelligence and big data processing, embodiments of the present disclosure enable classification of a brain anomaly shown in the received MRI image through training an MRI recognition model, thereby effectively improving classification accuracy of the brain anomaly and further enhancing diagnosis accuracy of the brain anomaly based on the MRI image.

Those skilled in the art should understand that the embodiments of the present disclosure may be provided as a method, an apparatus (device), or a computer program product. Therefore, the present disclosure may adopt a form of complete hardware embodiment, a complete software embodiment, or an embodiment combining software and hardware. Moreover, the present disclosure may adopt a form of a computer program product implemented on one or more computer-adaptable storage media including computer-adaptable program code (including, but not limited to, a magnetic disc memory, CD-ROM, and optical memory, etc.).

The present disclosure is described with reference to the flow diagram and/or block diagram of the method, apparatus (device) and computer program product according to the embodiments of the present disclosure. It should be understood that each flow and/or block in the flow diagram and/or block diagram, and a combination of the flow and/or block in the flow diagram and/or block diagram, may be implemented by computer program instructions. These computer program instructions may be provided to a processor of a general-purpose computer, a dedicated computer, an embedded processor, or other programmable data processing device to generate a machine, such that an apparatus for implementing the functions specified in one or more flows of the flow diagram and/or one or more blocks in the block diagram is implemented via the computer or the processor of other programmable data processing device.

These computer program instructions may also be stored in a computer readable memory that may boot the computer or other programmable data processing device to work in a specific manner such that the instructions stored in the computer readable memory to produce a product including an instruction apparatus, the instruction apparatus implementing the functions specified in one or more flows of the flow diagram and/or in one or more blocks in the block diagram.

These computer program instructions may be loaded on the computer or other programmable data processing device, such that a series of operation steps are executed on the computer or other programmable device to generate a processing implemented by the computer, such that the instructions executed on the computer or other programmable device provide steps for implementing the functions specified in one or more flows of the flow diagram and/or one or more blocks in the block diagram is implemented via the computer or the processor of other programmable data processing device.

Although the preferred embodiments of the present disclosure have been described. However, once those skilled in the art obtains the basic inventive idea, they may make alternative changes and modifications to these embodiments. Therefore, the appended claims intend to be construed as including the preferred embodiments and all changes and modifications falling into the scope of the present disclosure.

Apparently, those skilled in the art may make various alterations and transformations to the present disclosure without departing from the spirit and scope of the present disclosure. In this way, if such alterations and transformations to the present disclosure fall within the scope of the claims of the present disclosure and their equivalent technologies, the present disclosure also intends to include these changes and transformations.

We claim:

1. A method for classifying a brain anomaly based on a 3D MRI image, comprising:
    receiving a to-be-processed 3D MRI image, performing a convolution operation on an imaging sequence corresponding to the 3D MRI image based on a first neural network algorithm to obtain segment masks; and
    performing a classification operation on the imaging sequence corresponding to the 3D MRI image based on a second neural network algorithm and the segment masks to obtain a classification result of the brain anomaly.

2. The classifying method according to claim 1, wherein the performing a convolution operation on an imaging sequence corresponding to the 3D MRI image based on a first neural network algorithm to obtain segment masks comprises:
    performing a convolution operation on the imaging sequence corresponding to the 3D MRI image based on a Unet neural network algorithm to obtain segment masks corresponding to each time of convolution operation.

3. The classifying method according to claim 2, wherein the performing a convolution operation on the imaging sequence corresponding to the 3D MRI image to obtain segment masks corresponding to each time of convolution operation comprises:
    performing a first-layer convolution operation on the imaging sequence corresponding to the 3D MRI image to obtain a segment mask M1 corresponding to the first layer;
    performing a second-layer convolution operation on the segment mask M1 to obtain a segment mask M2 corresponding to the second layer;
    performing an $m+1^{th}$-layer convolution operation on a segment mask M2 to obtain a segment mask M (m+1) corresponding to the $m+1^{th}$ layer, wherein m is a natural number greater than 2;
    performing a $n^{th}$-layer convolution operation on the segment mask M(m+1) to obtain a segment mask Mn corresponding to the $n^{th}$ layer;
    wherein n is a natural number greater than m+1.

4. The classifying method according to claim 3, wherein the following conditions are satisfied between the segment masks and the convolution layer values corresponding to the convolution operation:
    for the convolution layer values from 1st to $n/2^{th}$, the numbers of rows or columns in matrices of their segment masks decrease gradually;
    for the convolution layer values from $2/n^{th}$ to $n^{th}$, the numbers of rows or columns in matrices of their segment masks increase gradually;
    wherein when the convolution layer value is $n/2^{th}$, the number of rows or columns of the matrix of its segment mask is the minimum.

5. The classifying method according to claim 2 wherein before performing a classification operation on the imaging sequence corresponding to the 3D MRI image based on a second neural network algorithm and the segment masks, the method further comprises:
    ranking the segment masks according to a sequence of time when the respective segment masks are generated.

6. The classifying method according to claim 5, wherein the ranking the segment masks according to a sequence of time when the respective segment masks are generated comprises:
    ranking the segment masks corresponding to the convolution layer values ranging from $n/2^{th}$ to $n^{th}$ in a descending order of the convolution layer values to obtain a ranking result.

7. The classifying method according to claim 6, wherein the performing a classification operation on the imaging sequence corresponding to the 3D MRI image based on a second neural network algorithm and the segment masks to obtain a classification result of the brain anomaly comprises:
    performing a convolution operation on the imaging sequence corresponding to the 3D MRI image based on the second neural network algorithm and the segment masks corresponding to the ranking result to obtain a convolution result; and
    identifying and classifying the brain anomaly based on the convolution result.

8. The classifying method according to claim 7, wherein the performing a convolution operation on the imaging sequence corresponding to the 3D MRI image based on the second neural network algorithm and the segment masks corresponding to the ranking result to obtain a convolution result comprises:
    performing the convolution operation on the imaging sequence corresponding to the 3D MRI image based on a second neural network algorithm and the segment mask Mn corresponding to the $n^{th}$ layer to obtain a first convolution result; and
    performing the convolution operation on the first convolution result based on the second neural network algorithm and the segment mask Mn−1 corresponding to the $n-1^{th}$ layer to obtain a second convolution result;
    performing the convolution operation on the $m-1^{th}$ convolution result based on the second neural network algorithm and the segment mask Mn−m corresponding to the $n-m^{th}$ layer to obtain an $m^{th}$ convolution result, where m is a natural number greater than or equal to n/2.

9. The classifying method according to claim 8, wherein the obtaining a classification result of the brain anomaly comprises:
    identifying and classifying the brain anomaly based on the $m^{th}$ convolution result.

10. An apparatus for classifying a brain anomaly based on a 3D MRI image, comprising: at least one processor and a memory, the memory storing a program, wherein the at least one processor is configured to perform steps of:
- receiving a to-be-processed 3D MRI image, performing a convolution operation on an imaging sequence corresponding to the 3D MRI image based on a first neural network algorithm to obtain segment masks; and
- performing a classification operation on the imaging sequence corresponding to the 3D MRI image based on a second neural network algorithm and the segment masks to obtain a classification result of the brain anomaly.

* * * * *